US009298268B2

(12) United States Patent
Liu et al.

(10) Patent No.: US 9,298,268 B2
(45) Date of Patent: Mar. 29, 2016

(54) ELECTRONIC DEVICE AND GESTURE ACTIVATION METHOD THEREOF

(71) Applicant: HTC Corporation, Taoyuan County (TW)

(72) Inventors: Chia-Yu Liu, Taoyuan County (TW); Chia-Hsiang Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 182 days.

(21) Appl. No.: 14/224,087

(22) Filed: Mar. 25, 2014

(65) Prior Publication Data
US 2015/0212582 A1    Jul. 30, 2015

Related U.S. Application Data

(60) Provisional application No. 61/932,784, filed on Jan. 29, 2014.

(51) Int. Cl.
*G06F 3/01* (2006.01)
*G06F 1/16* (2006.01)

(52) U.S. Cl.
CPC .............. *G06F 3/017* (2013.01); *G06F 1/1694* (2013.01)

(58) Field of Classification Search
CPC .. H04M 2250/12; G06F 3/017; G06F 3/0346; G06F 2200/1637; H04W 4/026; H04W 4/027
USPC ......................................................... 345/156
See application file for complete search history.

(56) References Cited

U.S. PATENT DOCUMENTS

| | | | | |
|---|---|---|---|---|
| 2012/0075182 A1* | 3/2012 | Kim | ...................... | G06F 3/0338 345/158 |
| 2012/0231839 A1* | 9/2012 | Seo | ......................... | G06F 3/017 455/556.1 |
| 2013/0024071 A1* | 1/2013 | Sivertsen | ............... | B60K 35/00 701/41 |
| 2014/0135058 A1* | 5/2014 | Sanchez | ................ | H04W 88/02 455/550.1 |
| 2015/0185836 A1* | 7/2015 | Slonneger | ............... | G06F 3/014 345/156 |

FOREIGN PATENT DOCUMENTS

CN    102196080 A    9/2011

\* cited by examiner

*Primary Examiner* — Viet Pham
(74) *Attorney, Agent, or Firm* — CKC & Partners Co., Ltd.

(57) ABSTRACT

An electronic device and an operating method thereof are provided. The operating method includes the following steps: setting whether a near index is valid or invalid in response to a near event or a far event of the device; setting a first tilting angle index valid in response to a tilting angle of the device staying within a first tilting angle range for a first predetermined time period; setting a first angular velocity index valid in response to an angular velocity of the device staying within a first angular velocity range for a second time period; setting a second tilting angle index valid in response to the tilting angle of the device staying within a second tilting angle range for a third predetermined time period and activating a function based on the near index, the first tilting angle index, the first angular velocity index and the second tilting angle index.

30 Claims, 8 Drawing Sheets

ELECTRONIC DEVICE AND GESTURE ACTIVATION METHOD THEREOF

RELATED APPLICATIONS

This application claims the priority benefit of U.S. Provisional Application Ser. No. 61/932,784, filed Jan. 29, 2014, which is herein incorporated by reference.

BACKGROUND

1. Field of Invention

The present invention relates to an electronic device. More particularly, the present invention relates to a gesture activation of an electronic device.

2. Description of Related Art

Due to the advancement of the electronic devices, e.g., mobile devices, tablets, wearable devices, etc., various functions of the electronic devices attracts much attention. Although the functions are helpful in our daily life, certain functions still require complicated procedures for use. In addition, procedures for activating the functions are likely to fail. For example, when a user receives an incoming call, the user sometimes hangs up the call since the user makes a wrong input (e.g., movement, touch or gestures of an electronic device) on a pad or a touch screen of his/her mobile device.

Recently, there are various methods proposed for automatically activating functions of the electronic devices. However, the methods nowadays are still not able to activate the functions accurately, which greatly bothers the users. For example, when a user receives an incoming call in a meeting, the user would like to keep the phone silent until the caller hangs up the call, but the user carelessly pick up the phone since the input of the user matches certain procedures of picking up the call.

As a result, there is a need to provide more intuitional device and method to assist the users in activating functions of the electronic device accurately.

SUMMARY

The invention provides an electronic device. The electronic device includes a proximity sensor, a motion sensor module, one and more processors and a non-transitory computer readable medium. The non-transitory computer-readable medium has computer-executable instructions to be executed by the one and more processors for performing a method. The method includes the following steps: setting a near index valid in response to receiving a near event detected by the proximity sensor, and setting the near index invalid in response to receiving a far event detected by the proximity sensor; setting a first tilting angle index valid in response to a determination that a tilting angle of the electronic device detected by the motion sensor module stays within a first predetermined tilting angle range for a first predetermined time period; setting a first angular velocity index valid in response to a determination that an angular velocity detected by the motion sensor module stays within a first predetermined angular velocity range for a second predetermined time period; setting a second tilting angle index valid in response to a determination that the tilting angle of the electronic device detected by the motion sensor module stays within a second predetermined tilting angle range for a third predetermined time period, wherein the second predetermined tilting angle range is different from the first predetermined tilting angle range; and activating a function based on the near index, the first tilting angle index, the first angular velocity index and the second tilting angle index.

The disclosure provides a gesture activation method suitable for an electronic device. The gesture activation method includes the following steps: setting a near index valid in response to a near event of the electronic device, and setting the near index invalid in response to a far event of the electronic device; setting a first tilting angle index valid in response to a determination that a tilting angle of the electronic device stays within a first predetermined tilting angle range for a first predetermined time period; setting a first angular velocity index valid in response to a determination that an angular velocity of the electronic device stays within a first predetermined angular velocity range for a second predetermined time period; setting a second tilting angle index valid in response to a determination that the tilting angle of the electronic device stays within a second predetermined tilting angle range for a third predetermined time period, wherein the second predetermined tilting angle range is different from the first predetermined tilting angle range; and activating the function based on the near index, the first tilting angle index, the first angular velocity index and the second tilting angle index.

The disclosure provides a gesture activation method suitable for an electronic device. The gesture activation method includes the following steps: determining whether there is a near event of the electronic device, or whether there is a far event of the electronic device; determining whether a tilting angle of the electronic device stays within a first predetermined tilting angle range; determining whether an angular velocity of the electronic device stays within one of a first predetermined angular velocity range or whether the angular velocity stays in a second predetermined angular velocity range; detecting whether there is another near event of the electronic device; determining whether the tilting angle of the electronic device is within a second predetermined tilting angle range or whether the tilting angle is within a third predetermined tilting angle range; activating a function of the electronic device when angular velocity of the electronic device has been within the first predetermined angular velocity range, and when the tilting angle of the electronic device has been within the second predetermined tilting angle range; and activating the function of the electronic device when angular velocity of the electronic device has been within the second predetermined angular velocity range, and when the tilting angle of the electronic device has been within the third predetermined tilting angle range.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
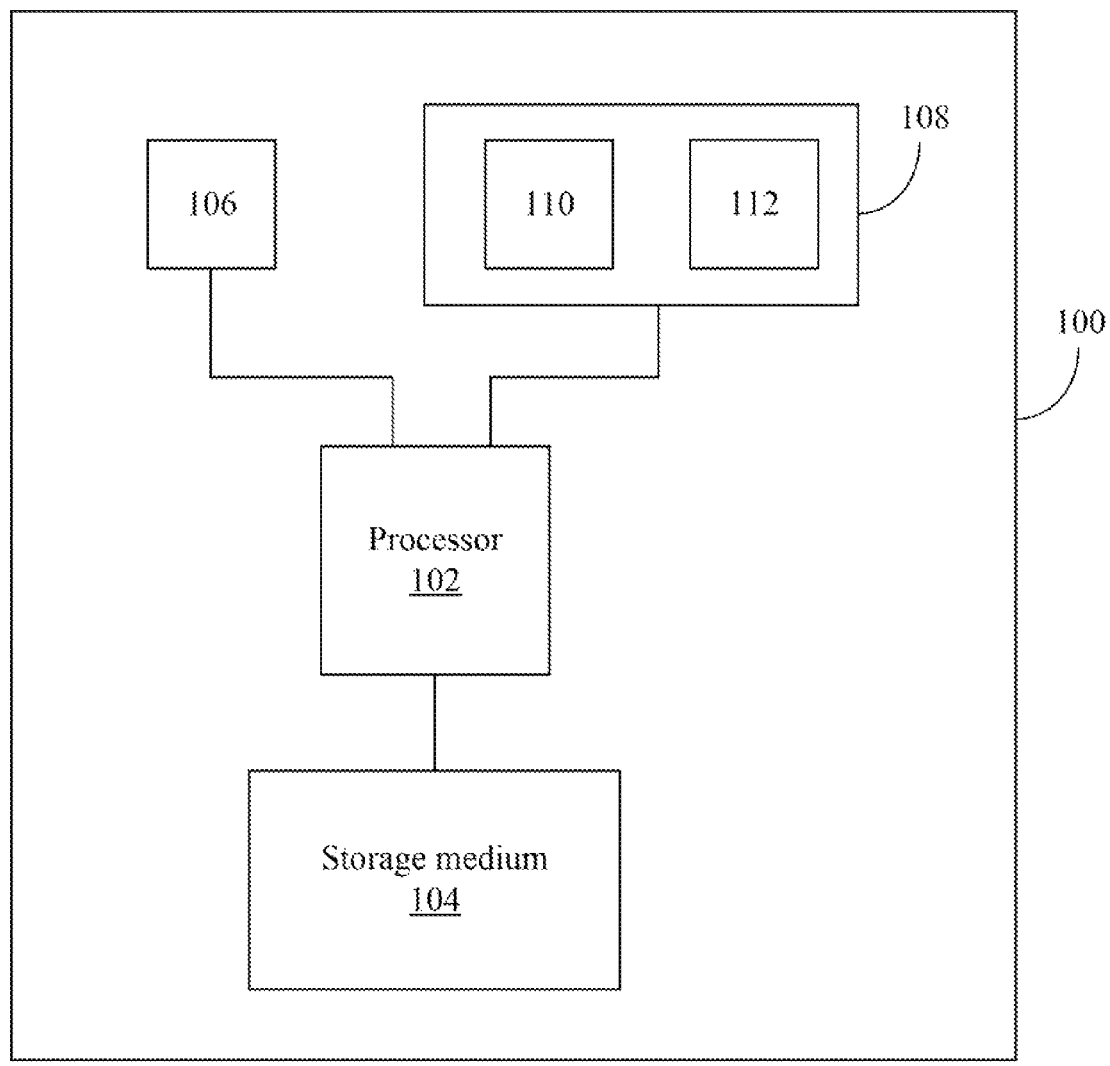
FIG. 1A is a schematic diagram illustrating an electronic device according to one embodiment of this disclosure.

Reference will now be made in detail to the present embodiments of the invention, examples of which are illustrated in the accompanying drawings. Wherever possible, the same reference numbers are used in the drawings and the description to refer to the same or like parts.

Figure 1B:
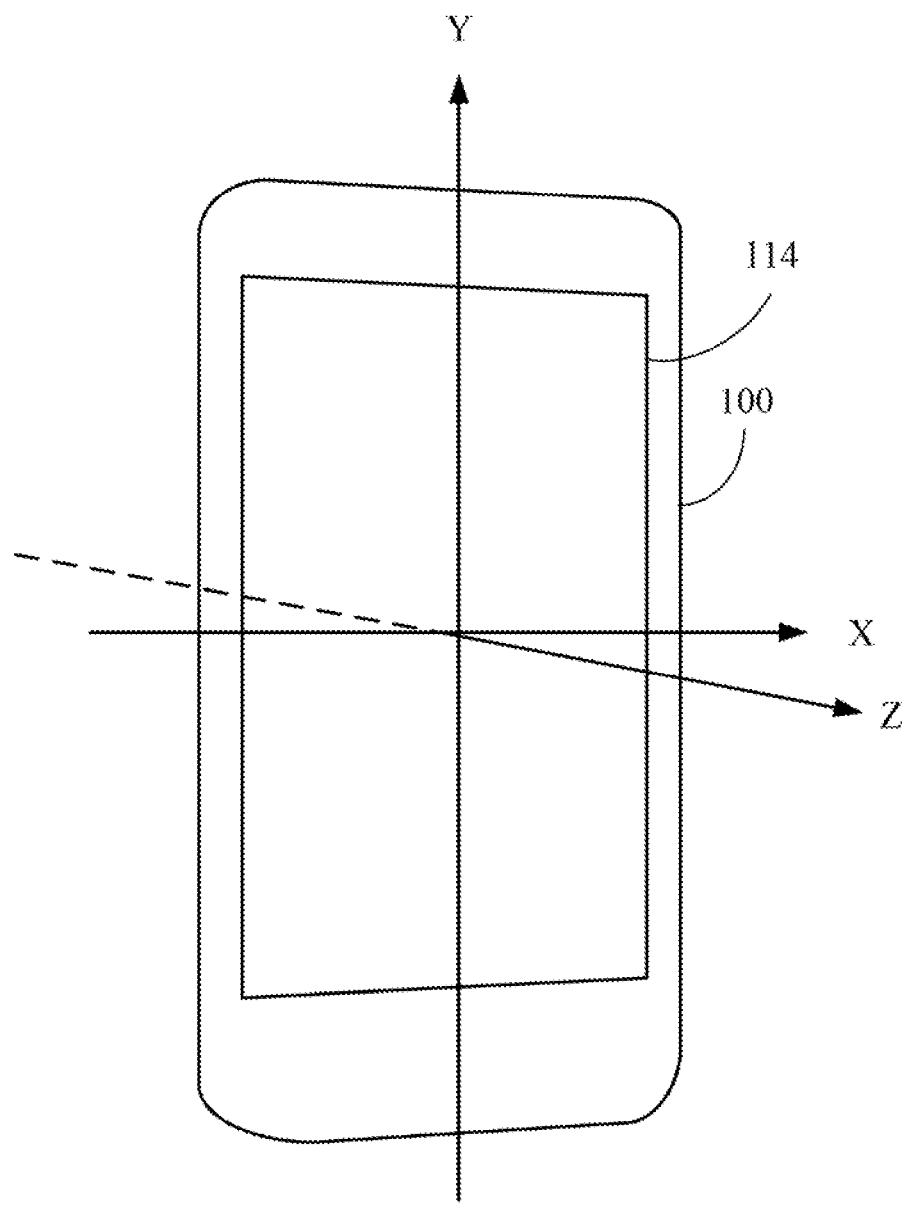
FIG. 1B is a schematic diagram illustrating the three axes of the electronic device in FIG. 1A according to one embodiment of this disclosure.

Reference is now made to FIG. 1A and FIG. 1B. FIG. 1A is a schematic diagram illustrating an electronic device 100 according to one embodiment of this disclosure. The electronic device 100 includes a processor 102, storage medium 104, a proximity sensor 106 and a motion sensor module 108. The processor 102 is electrically coupled to the storage medium 104, the proximity sensor 106 and the motion sensor module 108.

In some embodiments, the electronic device 100 may include a plurality of processors.

The processor 102 is configured to execute computer-executable instructions, in which the computer-executable instructions are stored in the storage medium 104.

In some embodiments, the processor 102 may be a central processing unit. In some embodiments, the storage medium 104 (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The proximity sensor 106 is configured to generate a first output data according to a distance between the electronic device 100 and objects nearby. The first output data is transmitted to the processor 102 for determining whether there is a near event or a far event of the electronic device 100.

In some embodiments, the first output data includes a reflecting strength value. The processor 102 detects whether there is a near event or a far event by comparing the reflecting strength value with a first threshold value. For example, when the first output data is greater than the first threshold value, the processor 102 detects a near event. In contrast, when the reflecting strength value is less than the first threshold value, the processor 102 detects a far event.

The sensor module 108 includes a first sensor 110 and a second sensor 112. In operation, the first sensor 110 is configured to detect a tilting angle of the electronic device 100. In more details, the motion sensor module 108 detects the acceleration of the electronic device 100 and the gravity so as to generate a second output data.

In some embodiments, the second output data includes a first accelerated value, a second accelerated value, and a third accelerated value. As shown in FIG. 1B, FIG. 1B is a schematic diagram illustrating the three axes of the electronic device 100 in FIG. 1A according to one embodiment of this disclosure. The first accelerated value, the second accelerated value and the third accelerated value corresponds to the acceleration of the electronic device 100 and gravity on an X axis, a Y axis and a Z axis of the electronic device 100 respectively. As shown in FIG. 1B, the X axis of the electronic device 100 is horizontal to a screen 114 of the electronic device 100 and points to the right, the Y axis is horizontal to the screen 114 of the electronic device 100 and points up, and the Z axis is vertical to the screen 114 and points outside of the screen 114. Therefore, according to the second output data, the processor 102 can calculate the tilting angle of the electronic device 100, in which the tilting angle includes a first tilting angle, a second tilting angle and a third tilting angle corresponding to tilting angles of the X axis, Y axis and Z axis respectively.

The second sensor 112 is configured to detect an angular velocity of the electronic device 100 so as to generate a third output data. In some embodiments, the third output data includes a first angular velocity value, a second angular velocity value and a third angular velocity value. The first angular velocity value, the second angular velocity value and the third angular velocity value correspond to the angular velocity around the X axis, the Y axis and the Z axis shown in FIG. 1B respectively.

In some embodiments, the first sensor 110 may be a gyroscope sensor, an accelerometer, etc. and the second sensor 112 may be a gyroscope sensor, an accelerometer, etc.

Figure 2A:
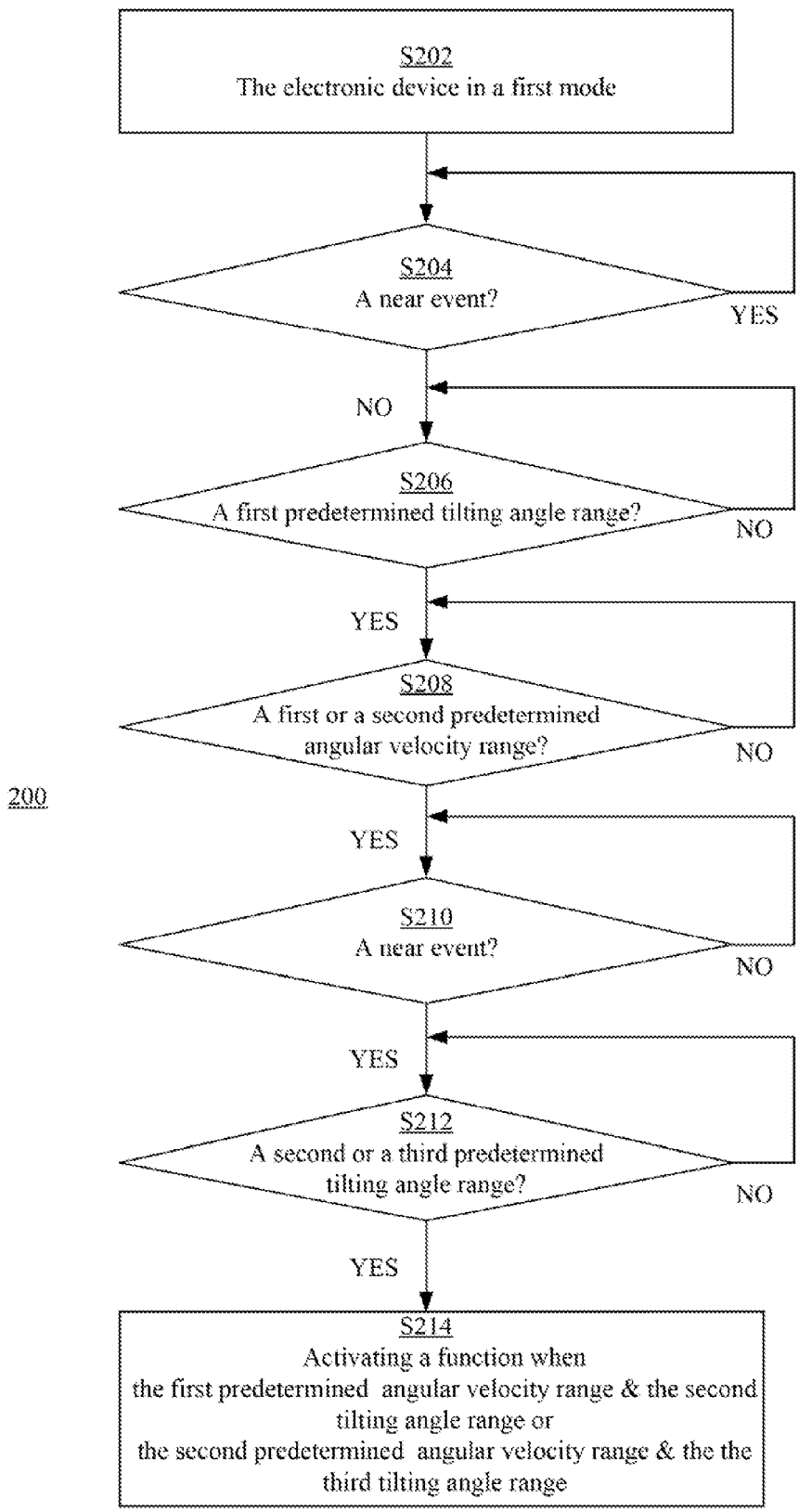
FIG. 2A is a flow diagram illustrating a gesture activation method for the electronic device according to one embodiment of this disclosure.

Reference is now made to FIG. 2A. FIG. 2A is a flow diagram illustrating a gesture activation method 200 for the electronic device 100 in FIG. 1A according to one embodiment of this disclosure. The gesture activation method 200 is for activating a function of the electronic device 100. The gesture activation method 200 includes the following steps.

In some embodiments, the gesture activation method 200 may take the form of a computer program stored in the storage medium 104.

As a start, in step S202, the electronic device 100 is in a first mode.

In some embodiments, the first mode can be an incoming call mode, extended sound mode, or a voice message notification mode.

In step S204, the proximity sensor 106 detects a distance of the electronic device 100 and an object nearby so as to generate the first output data, and the processor 102 detects whether there is a near event or a far event. For example, if the electronic device 100 is in a backpack, the proximity sensor 106 detects the distance of the backpack and the electronic device 100 so as to generate the first output data. Then, the processor 102 detects a near event according to the first output data.

Moreover, when the near event occurs, the processor 102 keeps detecting whether a near event or a far event (S204). When the far event occurs, the method moves to step S206.

In some embodiments, the processor 102 only detects a far event according to the first output data in step S204.

In step S206, the motion sensor module 108 detects acceleration of the electronic device 100 and gravity so as output the second output data. The processor 102 detects whether the electronic device 100 is within a first predetermined tilting angle range according to the second output data. If the electronic device 100 is not within the first predetermined tilting angle range, the processor 102 keeps detecting whether the electronic device 100 is within the first predetermined tilting angle range. If the electronic device 100 is in the first predetermined tilting angle range, the method moves to step 208.

In some embodiments, the first predetermined tilting angle range includes a first X tilting angle range, a first Y tilting angle range and a first Z tilting angle range. The first X tilting angle range is from −35 degree to 35 degree, the first Y tilting angle range is from −30 degree to 90 degree, and the first Z tilting angle range is from 0 degree to 90 degree.

In some embodiments, the first predetermined tilting angle range corresponds to a reading angle of the viewer. In other words, when the user views information on the electronic device 100, the tilting angle of the electronic device 100 normally falls within the first predetermined tilting angle range.

In step S208, the motion sensor module 108 detects the angular velocity of the electronic device 100 so as output the third output data. Then, the processor 102 determines whether the angular velocity of the electronic device 100 is within a first predetermined angular velocity range, or whether the angular velocity is within a second predetermined angular velocity range. If the angular velocity of the electronic device 100 is within the first predetermined angular velocity range or within the second predetermined angular velocity range, the method moves to S210. Otherwise, the motion sensor module 108 keeps detecting the angular velocity of the electronic device 100 (S208).

In some embodiments, the first predetermined angular velocity range includes a first predetermined X angular velocity range, a first predetermined Y angular velocity range and a first Z angular velocity range. The first predetermined X angular velocity range is greater than 0 rad/s, the first predetermined Y angular velocity range is less than 0 rad/s and a first Z angular velocity range is less than 0 rad/s. On the other hand, the second predetermined angular velocity range includes a second predetermined X angular velocity range, a second predetermined Y angular velocity range and a second Z angular velocity range. The second predetermined X angular velocity range is greater than 0 rad/s, the second predetermined Y angular velocity range is greater than 0 rad/s, and the second Z angular velocity range is greater than 0 rad/s.

In some embodiments, the first predetermined angular velocity range corresponds to a pick-up gesture of a right hand, and the second predetermined angular velocity range corresponds to a pick-up gesture of a left hand. In practical applications, the electronic device 100 manipulated by a right-handed user will detect an angular velocity range different from another angular velocity range detected on the electronic device 100 manipulated by a left-handed user. For example, the angular velocity range by the right-handed user is counter-clockwise; and the angular velocity range by the left-handed user is clockwise. In practices, the third output data (X, Y, Z angular velocities) detected by the motion sensor module 108 is analyzed to determine whether the pick-up gesture correspond to the right hand or the left hand.

In step S210, the proximity sensor 106 detects distances of the electronic device 100 and objects nearby, and the processor 102 detects whether there is a near event or another far event according to the first output data generated by the proximity sensor 106. When the near event occurs, the processor 102 keeps detecting whether there is a near event or a far event. When the far event occurs, the method moves to step S212.

In step S212, the motion sensor module 108 detects acceleration of the electronic device 100 and gravity so as output the second output data. The processor 102 detects whether the tilting angle of the electronic device 100 is within a second predetermined tilting angle range, or whether the tilting angle is within a third predetermined tilting angle range according to the second output data. If the electronic device 100 is not within one of the second predetermined tilting angle range and the third predetermined tilting angle range, the processor 102 keeps detecting the tilting angle of the electronic device 100. In contrast, if the angular velocity of the electronic device 100 is within the within the second predetermined tilting angle range or within the third predetermined tilting angle range, the method moves to step 214.

In some embodiments, the second predetermined tilting angle range includes a second predetermined X tilting angle range, a second predetermined Y tilting angle range and a second predetermined Z tilting angle range. The second predetermined X tilting angle range is from −90 degree to −10 degree, the second predetermined Y tilting angle range is from −30 degree to 90 degree, and the second predetermined Z tilting angle range is from −45 degree to 45 degree. On the other hand, the third predetermined tilting angle range includes a third predetermined X tilting angle range, a third predetermined V tilting angle range and a third predetermined Z tilting angle range. The third predetermined X tilting angle range is from 10 degree to 90 degree, the third predetermined Y tilting angle range is from −30 degree to 90 degree, and the third predetermined Z tilting angle range is from −45 to 45 degree.

In some embodiments, the second predetermined tilting angle range corresponds to a talking gesture of the right hand, and the third predetermined tilting angle range corresponds to a talking gesture of the left hand. In practical applications, the electronic device 100 manipulated by a right-handed user will detect a talking gesture different from another talking gesture manipulated by a left-handed user. For example, the talking gesture by the right-handed user is in a tilted position shaped like a slash, "/"; and, the talking gesture by the left-handed user is in another tilted position shaped like a backslash, "\". In practice, the second output data detected by the motion sensor module 108 is analyzed to determine whether the talking gesture corresponds to the right hand or the left hand.

In step S214, the processor 102 detects whether the electronic device 100 has matched the first predetermined angular velocity range and the second predetermined tilting angle range. In addition, the processor 102 checks whether the electronic device 100 has matched the second predetermined angular velocity range and the third predetermined the first predetermined tilting angle range. If the electronic device 100 has matched the first predetermined angular velocity range (i.e., the angular velocity range of the right-hand) and the second predetermined tilting angle range (i.e., the tilting angle of the right-hand), or if the electronic device 100 has matched the second predetermined angular velocity range (i.e., the angular velocity range of the left-hand) and the third predetermined tilting angle range (i.e., the tilting angle of the left-hand), the processor 102 activates the function of the electronic device 100. In other words, the processor 102 checks whether the angular velocity range (of right/left hand) matches the tilting angle (of right/left hand). For example, if the angular velocity and the tilting angle correspond to the right hand and left hand respectively, the function is not activated.

Figure 2B:
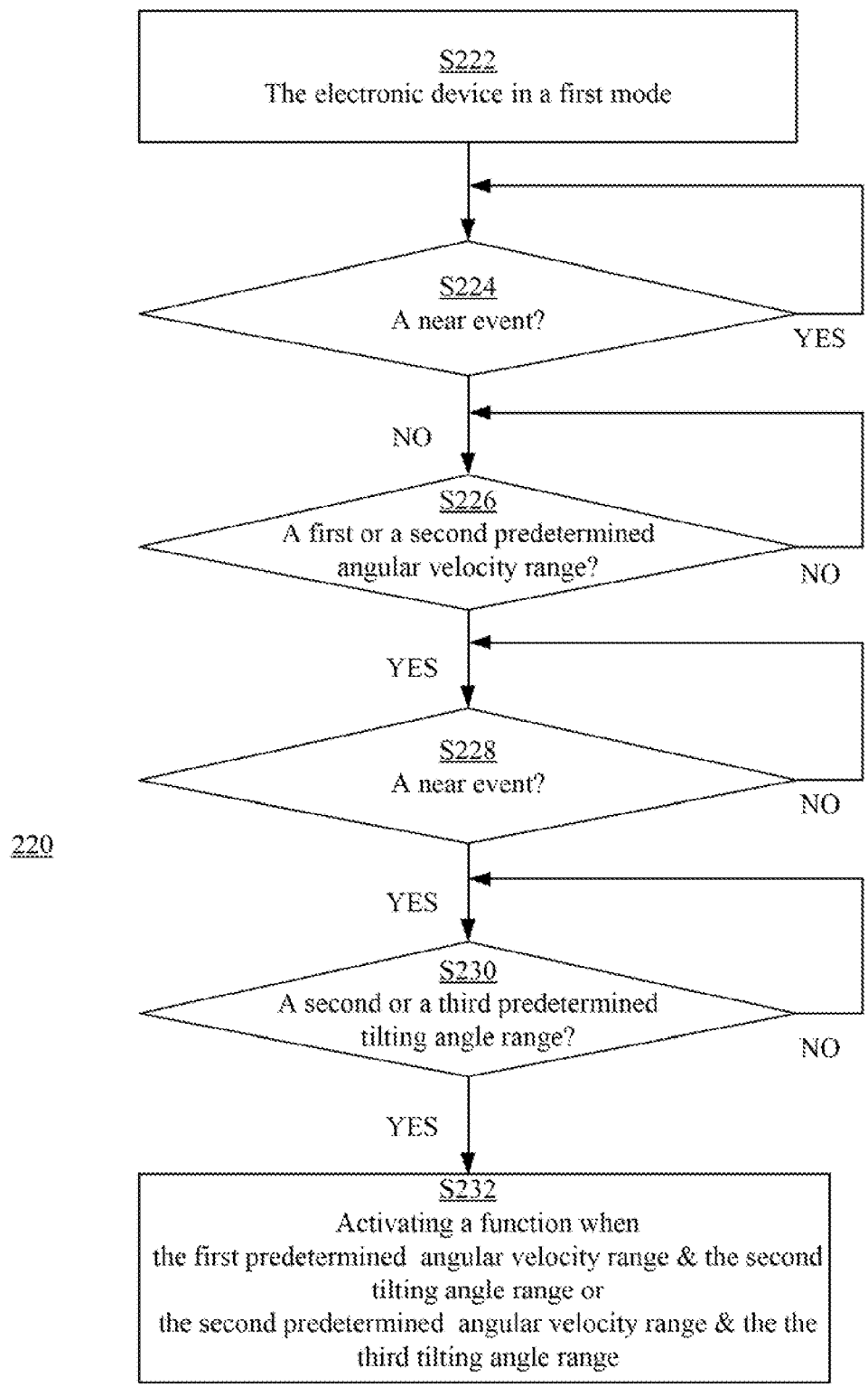
FIG. 2B is a flow diagram illustrating a gesture activation method for the electronic device according to one embodiment of this disclosure.

The reference is now made to FIG. 2B. FIG. 2B is a flow diagram illustrating a gesture activation method 220 for the electronic device 100 in FIG. 1A according to one embodiment of this disclosure. Compared with the gesture activation method 200 in FIG. 2A, the gesture activation method 220 does not check whether the tilting angle of the electronic device 100 is in the first predetermined tilting angle range. The gesture activation method 220 includes the following steps.

In step 222, the electronic device 100 is in a first mode.

In step 224, the proximity sensor 106 detects a distance of the electronic device 100 and an object nearby so as to generate the first output data, and the processor 102 detects whether there is a near event or a far event. When the near event occurs, the processor 102 keeps detecting whether a near event or a far event (S224). When the far event occurs, the method moves to step S226.

Then, step S226, step S228, step S230 and step S240 are similar to step S208, step S210, step S212 and step S214 respectively.

Figure 2C:
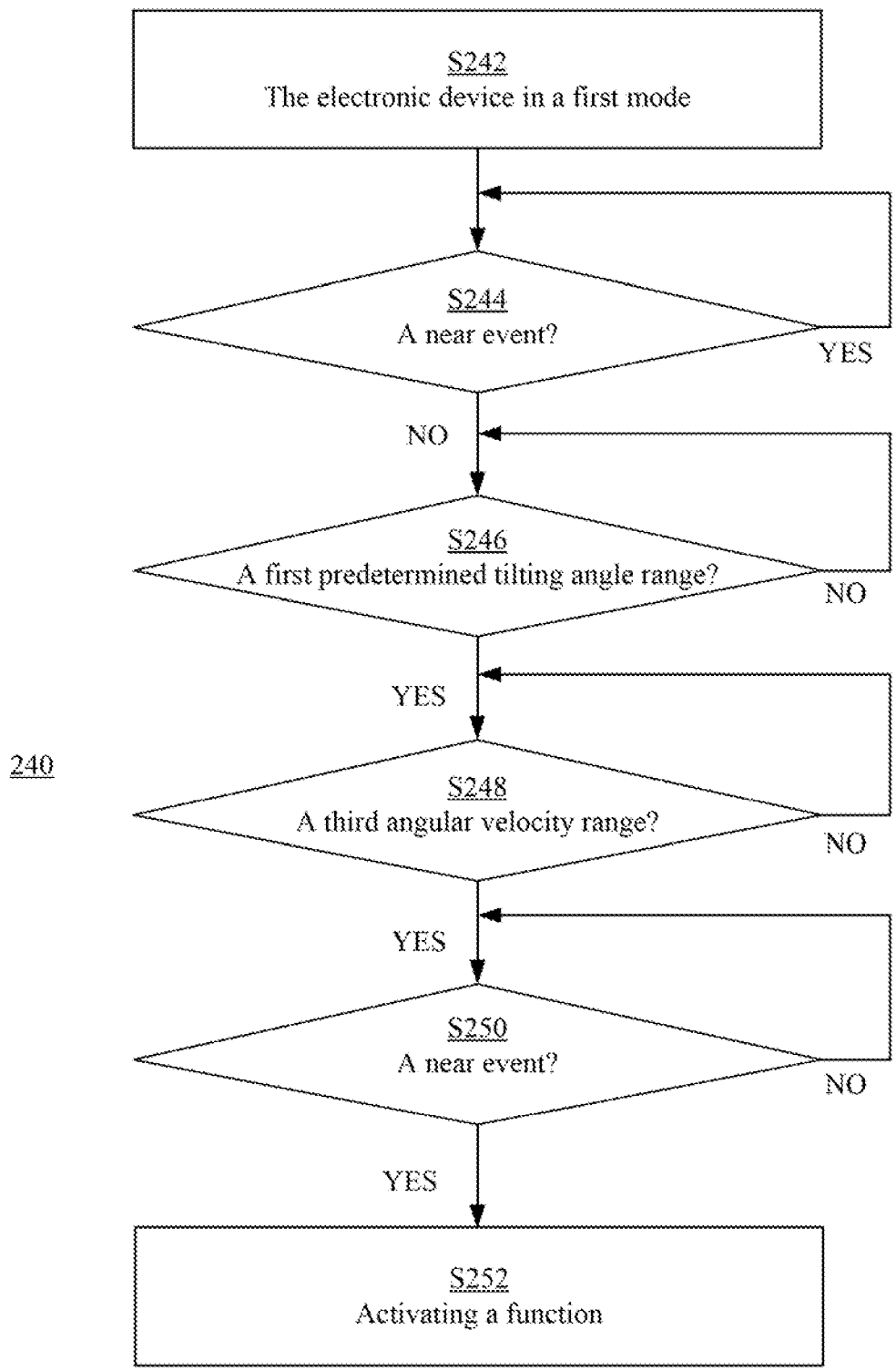
FIG. 2C is a flow diagram illustrating a gesture activation method for the electronic device according to one embodiment of this disclosure.

The reference is now made to FIG. 2C. FIG. 2C is a flow diagram illustrating a gesture activation method 240 for the electronic device 100 in FIG. 1A according to one embodiment of this disclosure. Compared with the gesture activation method 200 in FIG. 2A, the gesture activation method 240 does not check whether the angular velocity of the electronic device 100 is in the first or in the second predetermined angular velocity range, and the method 240 does not check whether the tilting angle of the electronic device 100 is in the second predetermined tilting angle range or whether the tilting angle of the electronic device 100 is in the third predetermined tilting angle range. The gesture activation method 240 includes the following steps.

Step S242, step S244 and step S246 are similar to step S202, step S204 and step S206 respectively.

Then, in step 248, the motion sensor module 108 detects the angular velocity of the electronic device 100 so as output the third output data. Then, the processor 102 determines whether the angular velocity of the electronic device 100 is within a third predetermined angular velocity range. If the angular velocity of the electronic device 100 is within the third predetermined angular velocity range, the method moves to S250. Otherwise, the motion sensor module 108 keeps detecting the angular velocity of the electronic device 100 (S248).

In step S250, the proximity sensor 106 detects distances of the electronic device 100 and objects nearby, and the processor 102 detects whether there is a near event or another far event according to the first output data generated by the proximity sensor 106. When the near event occurs, the processor 102 keeps detecting whether there is a near event or a far event (S250). When the far event occurs, the method moves to step S252.

In step S252, the processor 102 activates a function of the electronic device 100.

Figure 2D:
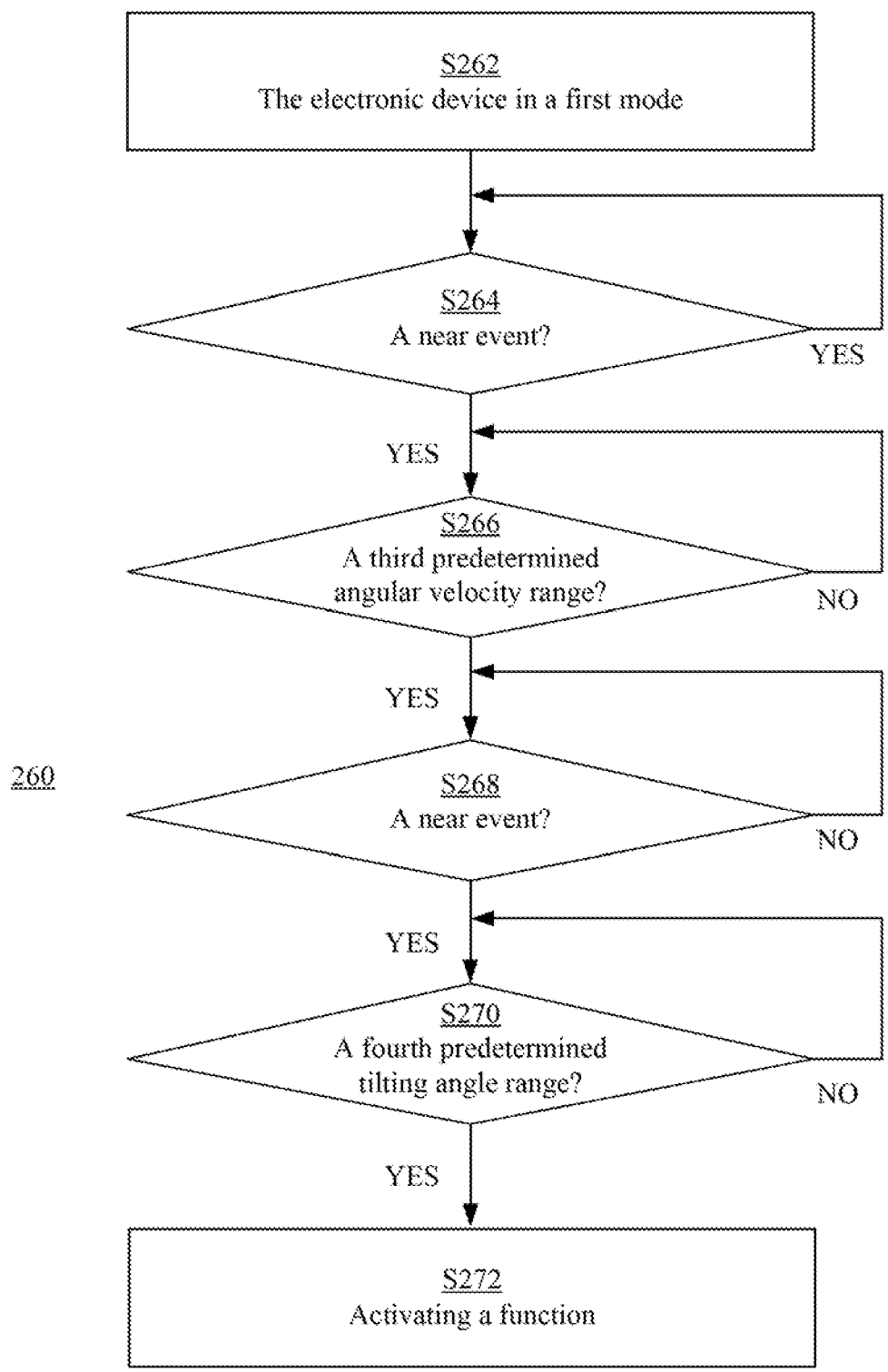
FIG. 2D is a flow diagram illustrating a gesture activation method for the electronic device according to one embodiment of this disclosure.

The reference is now made to FIG. 2D. FIG. 2D is a flow diagram illustrating a gesture activation method 260 for the electronic device 100 in FIG. 1A according to one embodiment of this disclosure. Compared with the gesture activation method 240 in FIG. 2C, the gesture activation method 260 does not check whether the tilting angle of the electronic device 100 is in the first predetermined tilting angle range, and the gesture activation method 260 further checks whether the tilting angle of the electronic device 100 is in the fourth predetermined tilting angle range. The gesture activation method 260 includes the following steps.

Step S262, step S264, step S266 and step 268 are similar to step S242, step 244, step S248 and step 250 in FIG. 2C respectively.

In step 270, the motion sensor module 108 detects acceleration of the electronic device 100 and gravity so as output the second output data. The processor 102 detects whether the tilting angle of the electronic device 100 is within a fourth predetermined tilting angle range. If the electronic device 100 is not within one of the fourth predetermined tilting angle range, the processor 102 keeps detecting the tilting angle of the electronic device 100. In contrast, if the angular velocity of the electronic device 100 is within the fourth predetermined tilting angle range, the method moves to step S272.

In step S272, the processor 102 activates a function of the electronic device 100.

Figure 3:
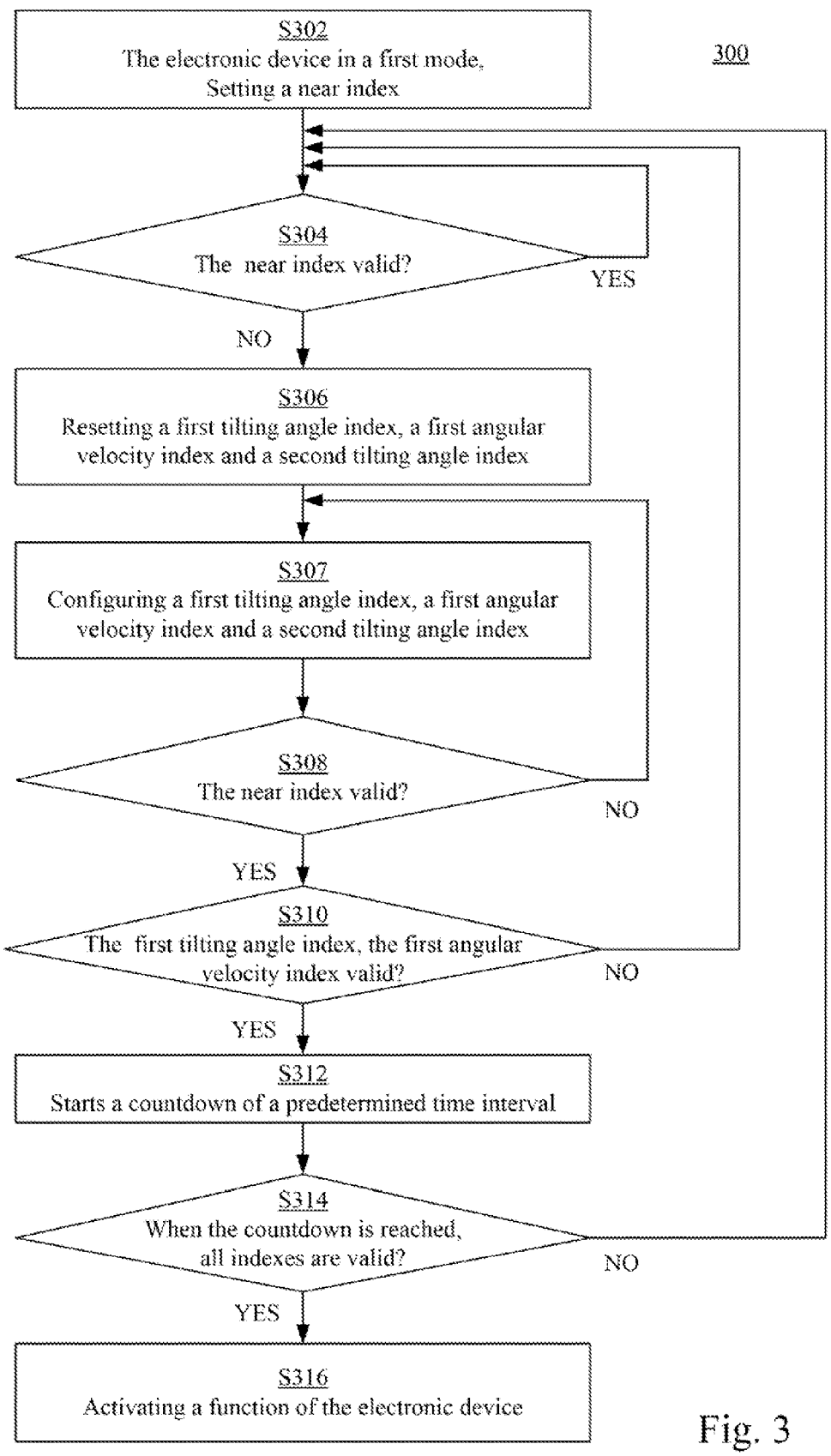
FIG. 3 is a flow diagram illustrating a gesture activation method for the electronic device according to one embodiment of this disclosure.

The reference is now made to FIG. 3. FIG. 3 is a flow diagram illustrating a gesture activation method 300 for the electronic device 100 according to one embodiment of this disclosure. The gesture activation method 300 is for activating a function of the electronic device 100 in FIG. 1A. The gesture activation method 300 includes the following steps.

In some embodiments, the gesture activation method 300 may take the form of a computer program stored in the storage medium 104.

First of all, in step S302, when the electronic device 100 is in the first mode, a near index begins to be set and configured in response to a near event or a far event detected by the proximity sensor 106. In more details, the near index is set to be valid if a near event of the electronic device 100 occurs, and the near index of the electronic device 100 is set to be invalid if a far event occurs.

In step S304, the processor 102 checks whether the near index is valid or invalid. If the near index is checked to be valid, the processor 102 keeps checking whether the near index is valid or invalid. If the near index is checked to be invalid, the method 300 moves to step S306.

In step S306, a first tilting angle index, a first angular velocity index and a second tilting angle index are reset by the processor 102 immediately after the near index is checked to be invalid in step S304.

In step S307, the first tilting angle index, the first angular velocity index and the second tilting angle index are configured by the processor 102 immediately after the first tilting angle index, the first angular velocity index and the second tilting angle index are reset by the processor 102.

The first tilting angle index is set to be valid in response to a determination by the processor 102 that a tilting angle of the electronic device 100 detected by the motion sensor module 108 stays within the first predetermined tilting angle range for a first predetermined time period. The first angular velocity index is set to be valid in response to a determination that an angular velocity detected by the motion sensor module 108 stays within the first predetermined angular velocity range for a second predetermined time period. The second tilting angle index is set to be valid in response to a determination that the tilting angle of the electronic device 100 detected by the motion sensor module 108 stays within a second predetermined tilting angle range for a third predetermined time period, in which the second predetermined tilting angle range is different from the first predetermined tilting angle range.

In some embodiments, a second angular velocity index and a third tilting angle index further begin to be reset and configured by the processor 102 immediately after the near index is checked to be invalid in step S304. The second angular velocity index is set to be valid in response to a determination that the angular velocity detected by the motion sensor module 108 stays within the second predetermined angular velocity range for a fourth predetermined time period. The third tilting angle index is set to be valid in response to a determination that the tilting angle of the electronic device 100 detected by the motion sensor module 108 stays within the third predetermined tilting angle range for a fifth predetermined time period, in which the third predetermined tilting angle range is different from the first predetermined tilting angle range and the second predetermined tilting angle range.

In some embodiments, the first predetermined time period may be 280 microseconds or a first sampling time of the motion sensor module 108, and the third predetermined time period may be 280 microseconds or the first sampling time of the motion sensor module 108. In some embodiments, the first sampling time corresponds to the first sensor 110.

In some embodiments, the second determined time period might be a second sampling time of the motion sensor module 108. In some embodiments, the second sampling time corresponds to the second sensor 112.

In step S308, the processor 102 check whether the near index is valid. If the near index is checked to be invalid, the method 300 moves to step S307 to configure the indexes. In contrast, if the near index is checked to be valid, the method 300 moves to step S310.

In step S310, the processor 102 checks whether the first tilting angle index and a first angular velocity index are both valid when the near index is checked to be valid in step S308. If one of the first tilting angle index and the first angular velocity index is checked to be invalid, the method moves to step S304. On the other hand, if both of the first tilting angle index and the first angular velocity index are both checked to be valid, the method moves to step S312. In step S312, the processor starts a time countdown of a predetermined time interval.

Moreover, only in the predetermined time interval immediately after the first tilting angle index and the first angular velocity index are all checked to be valid, the near index stays valid regardless of another far event detected by the proximity sensor 106 within a first period of time (e.g., 0.2 sec) immediately after the near index is checked to be valid in step 308. On the other hand, the first tilting angle index stays valid regardless of the tiling angle of the electronic device 100 being in within a second period of time (e.g., 2 sec) immediately after setting the first tilting angle index valid. The first angular velocity index stays valid regardless of the angular velocity of the electronic device 100 being at within a third period of time (e.g., 1.5 sec) immediately after setting the first angular velocity index valid.

In some embodiments, the second tilting angle index stays valid regardless of the tiling angle of the electronic device 100 being within a fourth period of time immediately after setting the second tilting angle index valid.

In some embodiments, the first tilting angle index and a first angular velocity index are no longer being set when the near index is checked to be valid in step S308.

In some embodiments, the second angular velocity index stays valid regardless of the angular velocity of the electronic device 100 being at within a fifth period of time (e.g., 1.5 sec) immediately after setting the second angular velocity index valid. The third tilting angle index stays valid regardless of the tiling angle of the electronic device 100 being within a sixth period of time immediately after setting the third tilting angle index valid, in which the fifth period of time is different from the sixth period of time.

In some embodiments, the second tilting angle index begins to be reset and configured when the near index is checked to be valid in step S308 in instead of when the near index is checked to be invalid in step S304.

In some embodiments, if both of the first tilting angle index and the first angular velocity index are both checked to be valid in step S310, a volume value of a speaker in the electronic device 100 is lowered down.

In some embodiments, the time countdown of the predetermined time interval may be implemented by a time counter of the electronic device 100.

In step S314, when the time countdown of the predetermined time interval is reached, the processor 102 checks whether the near index, the first tilting angle index, the first angular velocity index and the second tilting angle index are all valid. If one of the near index, the first tilting angle index, the first angular velocity index and the second tilting angle index is invalid, the method moves to step S304. If all of the near index, the first tilting angle index, the first angular velocity index and the second tilting angle index are all valid, the method 300 moves to step S316.

In some embodiments, if the near index is checked to be valid in step S308, the method 300 may directly moves to step S314.

In some embodiments, in step S314, the processor 102 checks whether the near index and a combination selected from the first tilting angle index, the first angular velocity index and the second tilting angle index are both valid. When the combination only includes an index, the combination is valid if the index is valid. On the other hand, when the combination includes a plurality of indexes, the combination is valid if all of the indexes are valid. If one of the near index and the combination is invalid, the method 300 moves to step 304. If the near index and the combination are both valid, the method 300 moves to step S316. For instance, the combination includes the first tilting angle index, the first angular velocity index and the second tilting angle index. If one of the near index, the first tilting angle index, the first angular velocity index and the second tilting angle index is invalid, the method moves to step S304. If the near index, the first tilting angle index, the second angular velocity index and the third tilting angle index are all valid, the method 300 moves to step S316.

In some embodiments, in step S314, the processor 102 checks whether a combination selected from the first tilting angle index, the first angular velocity index and the second tilting angle index is valid without checking whether the near index is valid. When the combination only includes an index, the combination is valid if the index is valid. On the other hand, when the combination includes a plurality of indexes, the combination is valid if all of the indexes are valid. If the combination is invalid, the method 300 moves to step 304. If the combination is valid, the method 300 moves to step S316.

In step S316, the processor 102 activates the function of the electronic device.

In some embodiments, the function may be picking up an incoming call, turning the electronic device 100 from an extended sound mode to a normal answering mode or listening to the voice message.

Figure 4A:
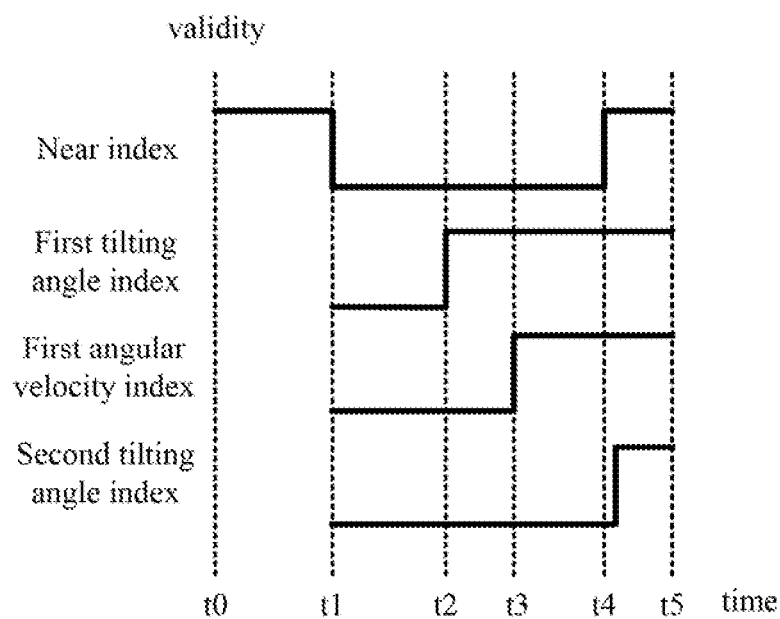
FIG. 4A is a timing diagram gesture activation method for the electronic device according to one embodiment of this disclosure.
Figure 4B:
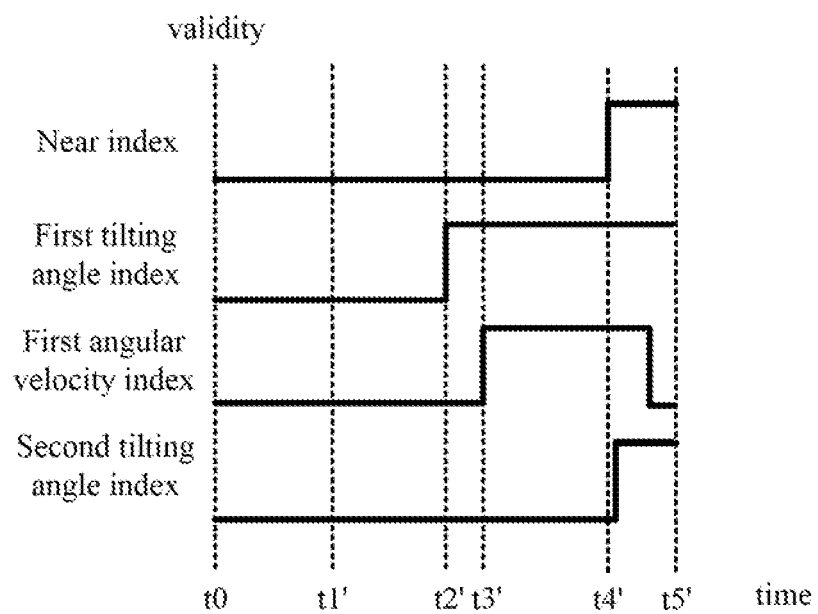
FIG. 4B is another timing diagram gesture activation method for the electronic device according to one embodiment of this disclosure.

The reference is now made to FIG. 4A and FIG. 4B. FIG. 4A is a timing diagram of the gesture activation method 300 for the electronic device 100 according to one embodiment of this disclosure. FIG. 4B is another timing diagram of the gesture activation method 300 for the electronic device 100 according to one embodiment of this disclosure.

As shown in FIG. 4A, when the electronic device 100 is in the first mode, the near index is set to valid at time t0 since a near event of the electronic device 100 occurs at time t0. Then, the electronic device 100 is checked to be invalid at time t1, and the first tilting angle index, first angular velocity index, the second tilting angle index begin to be reset and configured. The first tilting angle index is set to be valid at time t2. The first angular velocity index is set to be valid at time t3. At time t4, the near index is again checked to be valid, and the processor 102 starts a time countdown of the predetermined time period until time t5. During the predetermined time period from time t4 to time t5, the second tilting angle index is set to be valid. Since all of the near index, first tilting angle index, the first angular velocity index and the second tilting angle index are checked to be true at time t5, the processor 102 activates the function of the electronic device 100 at time t5.

As shown in FIG. 4B, when the electronic device 100 is in the first mode, the near index is set to invalid at time t0 since a far event of the electronic device 100 is far from any object at time t0. At the same time t0, the first tilting angle index, first angular velocity index and the second tilting angle index begin to be reset and configured. The first tilting angle index is set to be valid at time t2. The first angular velocity index is set to be valid at time t3'. At time t4, the near index is checked to be valid, and the processor 102 starts a time countdown of the predetermined time period until time t5. During the predetermined time period from time t4 to time t5, the second tilting angle index is set to be valid, but the first angular velocity index is set to be invalid since the first angular velocity index only stays valid regardless of the angular velocity of the electronic device 100 being at within the third period of time immediately after setting the first angular velocity index valid. Therefore, the processor 102 does not activate the function of the electronic device 100 at time t5, and the first tilting angle index, the first angular velocity index and the second tilting angle index are reset.

Although the present invention has been described in considerable detail with reference to certain embodiments thereof, other embodiments are possible. Therefore, the spirit and scope of the appended claims should not be limited to the description of the embodiments contained herein.

It will be apparent to those sidled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic device, comprising:
a proximity sensor;
a motion sensor module;
one and more processors; and
a non-transitory computer-readable medium having computer-executable instructions to be executed by the one and more processors for performing a method, comprising:
setting a near index valid in response to receiving a near event detected by the proximity sensor, and setting the near index invalid in response to receiving a far event detected by the proximity sensor;
setting a first tilting angle index valid in response to a determination that a tilting angle of the electronic device detected by the motion sensor module stays within a first predetermined tilting angle range for a first predetermined time period;
setting a first angular velocity index valid in response to a determination that an angular velocity detected by the motion sensor module stays within a first predetermined angular velocity range for a second predetermined time period;
setting a second tilting angle index valid in response to a determination that the tilting angle of the electronic device detected by the motion sensor module stays within a second predetermined tilting angle range for a third predetermined time period, wherein the second predetermined tilting angle range is different from the first predetermined tilting angle range; and
activating a function based on the near index, the first tilting angle index, the first angular velocity index and the second tilting angle index.

2. The electronic device as claimed in claim 1, wherein the step of activating the function comprises:
activating the function if four indexes of the near index, the first tilting angle index, the first angular velocity index and the second tilting angle index are all checked to be valid.

3. The electronic device as claimed in claim 2, wherein the method further comprising:
checking whether the first tilting angle index and the first angular velocity index are all valid; and
checking whether the four indexes of the near index, the first tilting angle index, the first angular velocity index and the second tilting angle index are all valid after the first tilting angle index and the first angular velocity index are all checked to be valid.

4. The electronic device as claimed in claim 3, wherein the step of checking the four indexes comprises:
checking whether the four indexes of the near index, the first tilting angle index, the first angular velocity index and the second tilting angle index are all valid a predetermined time interval immediately after the first tilting angle index and the first angular velocity index are all checked to be valid.

5. The electronic device as claimed in claim 4, wherein only in the predetermined time interval immediately after the first tilting angle index and the first angular velocity index are all checked to be valid are all checked to be valid, the near index stays valid regardless of receiving a far event from the proximity sensor within a first period of time immediately after setting the near index valid.

6. The electronic device as claimed in claim 3, wherein the step of checking whether the first tilting angle index and the first angular velocity index are all valid comprises:
checking whether the near index is valid; and
checking whether the first tilting angle index and the first angular velocity index are all valid in response to the near index being checked to be valid.

7. The electronic device as claimed in claim 6, wherein the step of checking whether the near index is valid comprises:
checking whether the near index is valid after the near index is checked to be invalid.

8. The electronic device as claimed in claim 7, wherein the method further comprises:
configuring the first tilting angle index according to the tilting angle detected by the motion sensor module in response to the near index being checked to be invalid; and
configuring the first angular velocity index according to the angular velocity detected by the motion sensor module in response to the near index being checked to be invalid.

9. The electronic device as claimed in claim 8, wherein the method further comprises:
configuring the second tilting angle index according to the tilting angle detected by the motion sensor module in response to the near index being checked to be invalid.

10. The electronic device as claimed in claim 9, wherein the first tilting angle index stays valid regardless of the tiling angle of the handheld electronic device being in within a second period of time immediately after setting the first tilting angle index valid.

11. The electronic device as claimed in claim 9, wherein the first angular velocity index stays valid regardless of the angular velocity of the handheld electronic device being at within a third period of time immediately after setting the first angular velocity index valid.

12. The electronic device as claimed in claim 9, wherein the second tilting angle index stays valid regardless of the tiling angle of the handheld electronic device being in within a fourth period of time immediately after setting the second tilting angle index valid.

13. The electronic device as claimed in claim 3, wherein the method further comprises:
    lowering a volume value of a speaker in the electronic device in response to the first tilting angle index and the first angular velocity index are all being checked to be valid.

14. The electronic device as claimed in claim 1, wherein the method further comprises:
    setting a second angular velocity index valid in response to in response to a determination that the angular velocity detected by the motion sensor module stays within a second predetermined angular velocity range for a fourth predetermined time period;
    setting a third tilting angle index valid in response to a determination that the tilting angle of the electronic device detected by the motion sensor module stays within a third predetermined tilting angle range for a fifth predetermined time period, wherein the third predetermined tilting angle range is different from the first predetermined tilting angle range and the second predetermined tilting angle range; and
    activating the function further based on the second angular velocity index and the third tilting angle index.

15. The electronic device as claimed in claim 14, wherein the step of activating the function comprises:
    activating the function if four indexes of the near index, the first tilting angle index, the first angular velocity index and the second tilting angle index are all checked to be valid; and
    activating the unction if four indexes of the near index, the first tilting angle index, the second angular velocity index and the third tilting angle index are all checked to be valid.

16. A gesture activation method, suitable for an electronic device, comprising:
    setting a near index valid in response to a near event of the electronic device, and setting the near index invalid in response to a far event of the electronic device;
    setting a first tilting angle index valid in response to a determination that a tilting angle of the electronic device stays within a first predetermined tilting angle range for a first predetermined time period;
    setting a first angular velocity index valid in response to a determination that an angular velocity of the electronic device stays within a first predetermined angular velocity range for a second predetermined time period;
    setting a second tilting angle index valid in response to a determination that the tilting angle of the electronic device stays within a second predetermined tilting angle range for a third predetermined time period, wherein the second predetermined tilting angle range is different from the first predetermined tilting angle range; and
    activating the function based on the near index, the first tilting angle index, the first angular velocity index and the second tilting angle index.

17. The method as claimed in claim 16, wherein the step of activcating the function comprises:
    activating the function if four indexes of the near index, the first tilting angle index, the first angular velocity index and the second tilting angle index are all checked to be valid.

18. The method as claimed in claim 17, further comprising:
    checking whether the first tilting angle index and the first angular velocity index are all valid; and
    checking whether the four indexes of the near index, the first tilting angle index, the first angular velocity index and the second tilting angle index are all valid after the first tilting angle index and the first angular velocity index are all checked to be valid.

19. The method as claimed in claim 18, wherein the step of checking the four indexes comprises:
    checking whether the four indexes of the near index, the first tilting angle index, the first angular velocity index and the second tilting angle index are all valid a predetermined time interval immediately after the first tilting angle index and the first angular velocity index are all checked to be valid.

20. The method as claimed in claim 19, wherein only in the predetermined time interval immediately after the first tilting angle index and the first angular velocity index are all checked to be valid, the near index stays valid regardless of receiving another far event within a first period of time immediately after setting the near index valid.

21. The method as claimed in claim 18, wherein the step of checking whether the first tilting angle index and the first angular velocity index are all valid comprises:
    checking whether the near index is valid; and
    checking whether the first tilting angle index and the first angular velocity index are all valid in response to the near index being checked to be valid.

22. The method as claimed in claim 21, wherein the step of checking whether the near index is valid comprises:
    checking whether the near index is valid after the near index is checked to be invalid.

23. The method as claimed in claim 22, further comprises:
    configuring the first tilting angle index according to the tilting angle of the electronic device in response to the near index being checked to be invalid; and
    configuring the first angular velocity index according to the angular velocity of the electronic device in response to the near index being checked to be invalid.

24. The method as claimed in claim 23, further comprises:
    configuring the second tilting angle index according to the tilting angle of the electronic device in response to the near index being checked to be invalid.

25. The method as claimed in claim 24, wherein the first tilting angle index stays valid regardless of the tiling angle of the handheld electronic device being in within a second period of time immediately after setting the first tilting angle index valid.

26. The method as claimed in claim 24, wherein the first angular velocity index stays valid regardless of the angular velocity of the handheld electronic device being at within a third period of time immediately after setting the first angular velocity index valid.

27. The method as claimed in claim 24, wherein the second tilting angle index stays valid regardless of the tiling angle of the handheld electronic device being in within a fourth period of time immediately after setting the second tilting angle index valid.

28. The method as claimed in claim 18, further comprising:
lowering a volume value of a speaker in the electronic device in response to the first tilting angle index and the first angular velocity index are all being checked to be valid.

29. The method as claimed in claim 16, further comprising:
setting a second angular velocity index valid in response to in response to a determination that the angular velocity of the electronic device stays within a second predetermined angular velocity range for a fourth predetermined time period;
setting a third tilting angle index valid in response to a determination that the tilting angle of the electronic device stays within a third predetermined tilting angle range for a fifth predetermined time period, wherein the third predetermined tilting angle range is different from the first predetermined tilting angle range and the second predetermined tilting angle range; and
activating the function further based on the second angular velocity index and the third tilting angle index.

30. The method as claimed in claim 29, wherein the step of activating the function comprises:
activating the function if four indexes of the near index, the first tilting angle index, the first angular velocity index and the second tilting angle index are all checked to be valid; and
activating the unction if four indexes of the near index, the first tilting angle index, the second angular velocity index and the third tilting angle index are all checked to be valid.

* * * * *